No. 741,510. PATENTED OCT. 13, 1903.
R. LANG.
VARIABLE SPEED MECHANISM.
APPLICATION FILED JUNE 6, 1902.
NO MODEL. 3 SHEETS—SHEET 1.
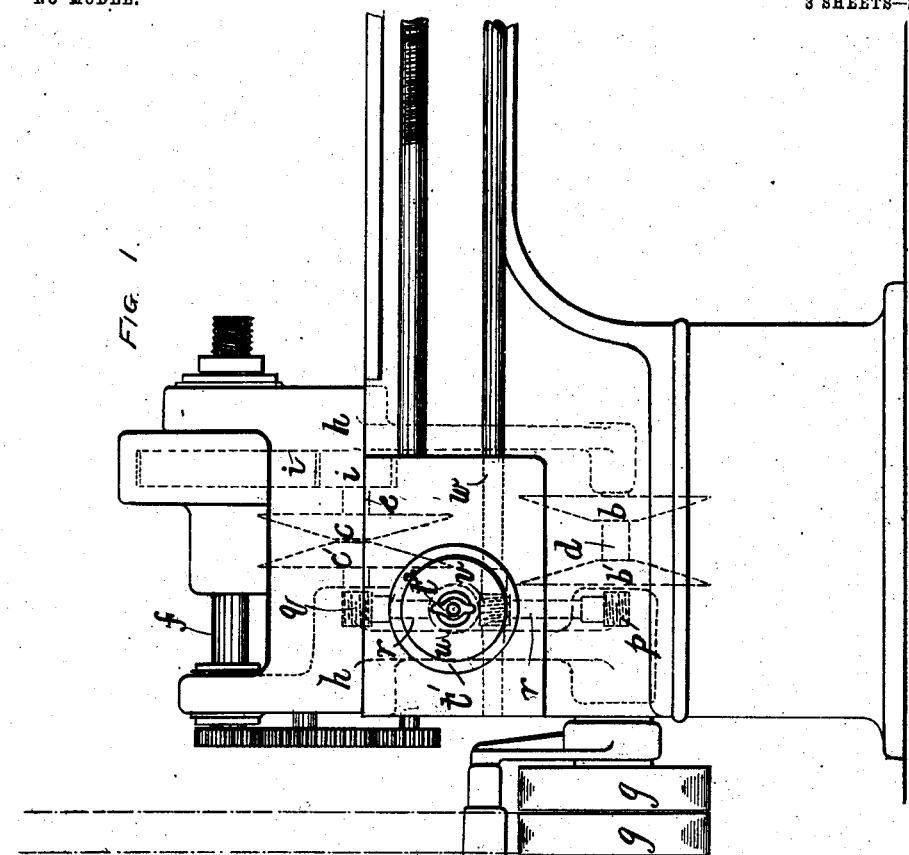
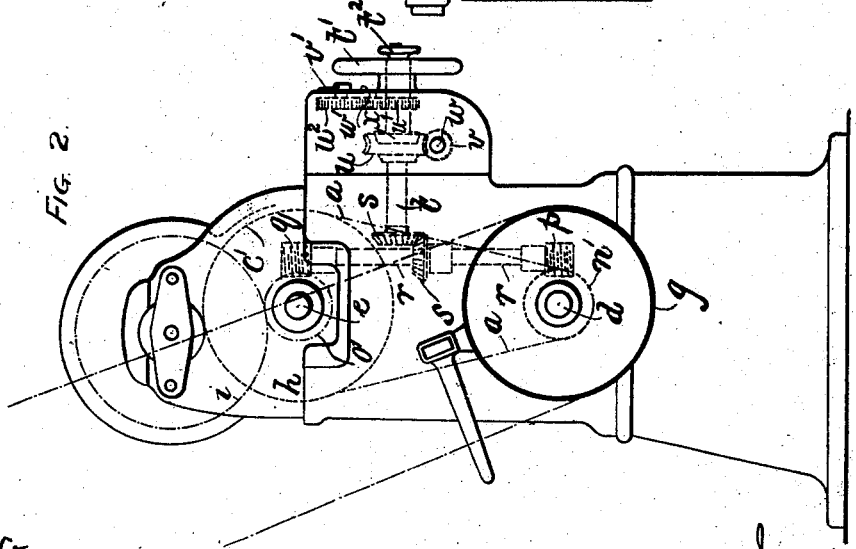

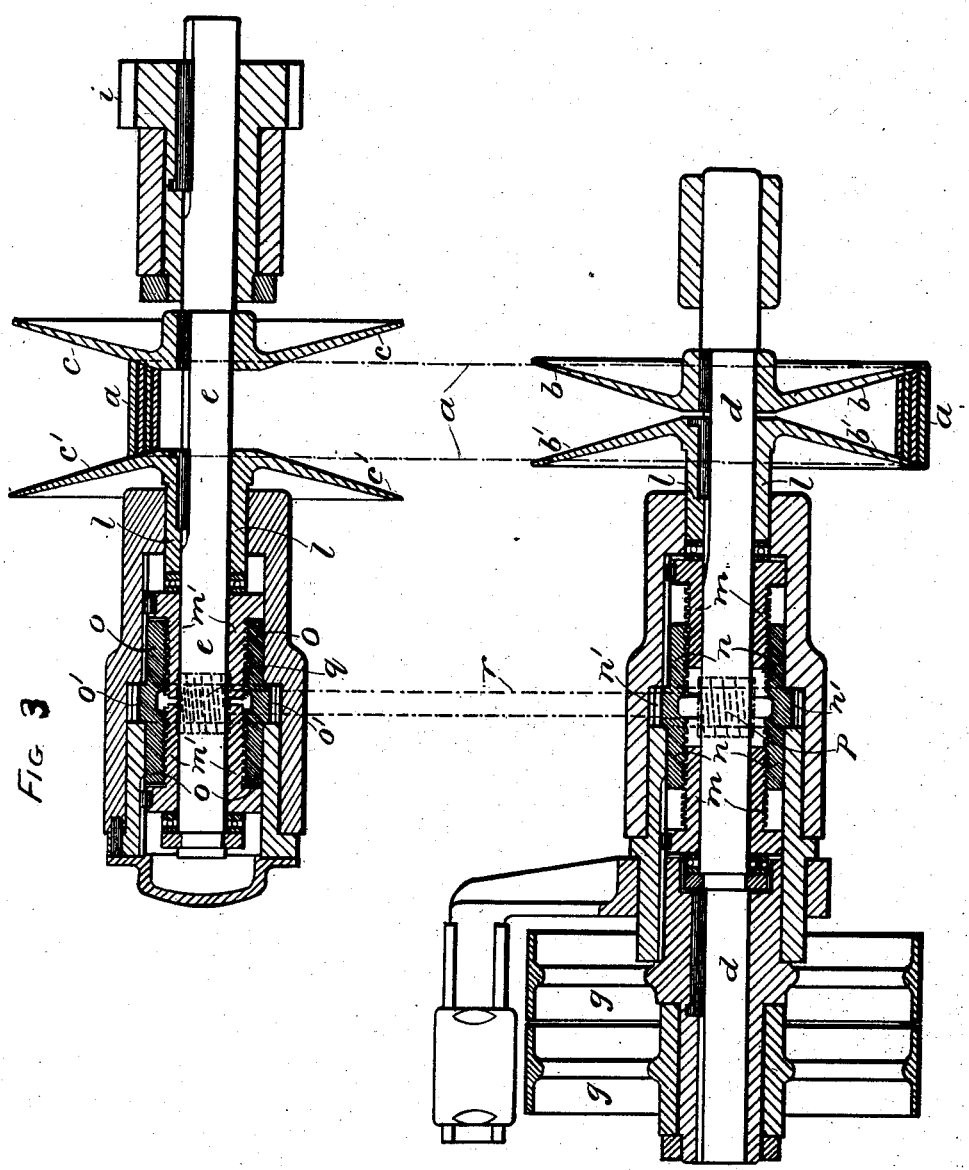

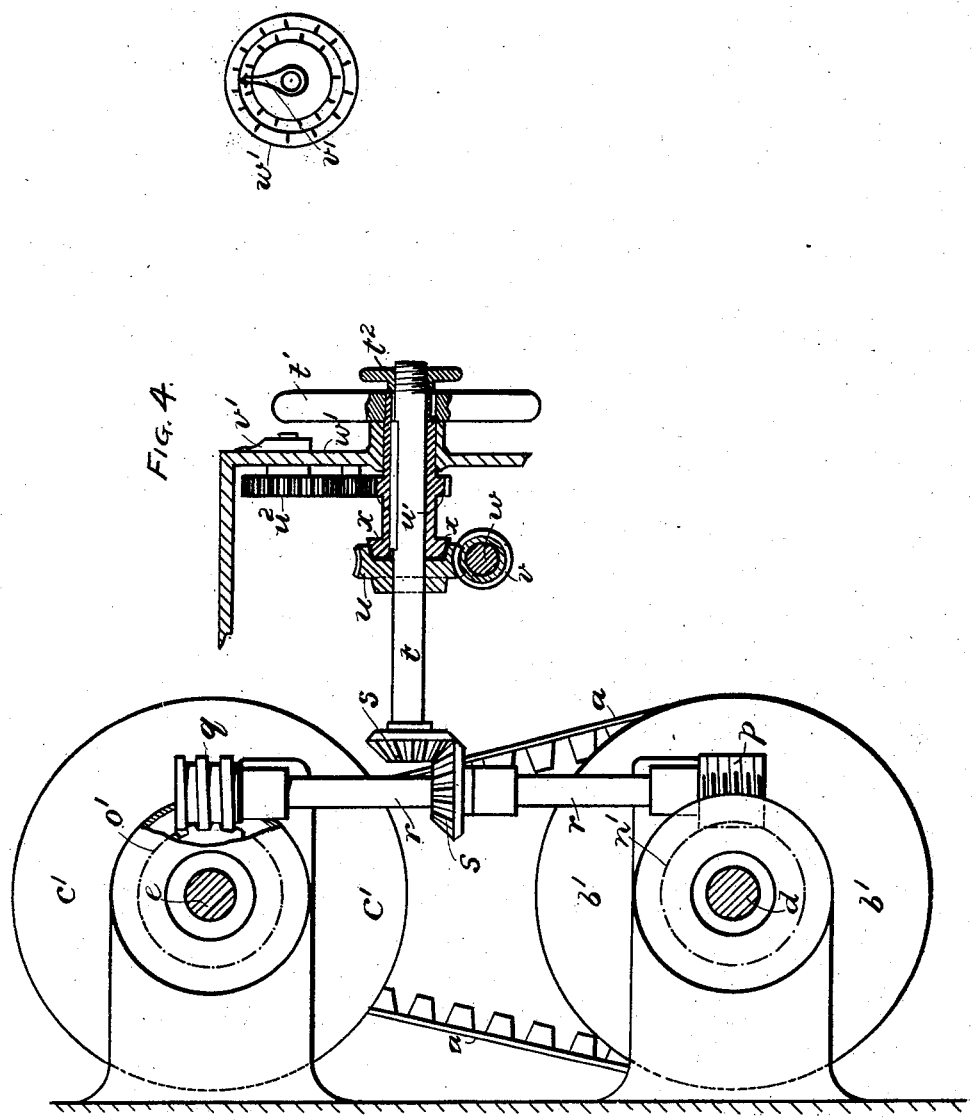

No. 741,510. Patented October 13, 1903.

UNITED STATES PATENT OFFICE.

ROBERT LANG, OF JOHNSTONE, SCOTLAND.

VARIABLE-SPEED MECHANISM.

SPECIFICATION forming part of Letters Patent No. 741,510, dated October 13, 1903.

Application filed June 6, 1902. Serial No. 110,541. (No model.)

*To all whom it may concern:*

Be it known that I, ROBERT LANG, a subject of the King of the United Kingdom of Great Britain and Ireland, residing at Mary street, Johnstone, near Glasgow, Scotland, have invented certain new and useful Improvements in Variable-Speed Mechanism, (for which application for patents have been made in Great Britain, viz: No. 26,111, dated December 21, 1901, and No. 8,926, dated April 17, 1902,) of which the following is a specification.

This invention has for its object to provide in lathes, such as horizontal screw-cutting and surfacing lathes and vertical-boring lathes or mills, so as to form a component part of the same, a speed-varying gear which may be used either alone or in conjunction with gear-wheels and clutches or other ordinary means for changing the speed of the running shafts or spindles, whereby there may be obtained any minute degree of variation or a continuous or progressive variation of speed, as distinguished from the usual sharply-graduated or intermittent variation produced by the use of belts and cones of other ordinary gear.

The invention has further for its objects to provide means whereby the speed of the running spindle or of the rotating work carried by the chuck or other work-carrier driven by or from said spindle may be automatically or otherwise varied as the cutting-tool is fed forward toward the center or to take a smaller circumferential cut in order that approximately uniform speed of the portion of the work for the time being operated on by the cutting-tool may be maintained and also to provide means for indicating the rate of speed of the running spindle of the lathe at any time.

The variable-speed gear employed is of the kind in which two parallel shafts are fitted each with a pulley of variable diameter formed by a pair of conical disks which are adapted to slide upon their shafts and which have their cone-surfaces facing each other, so that they form bearing-surfaces for a bevel-edged driving-band mounted to run upon the said cone-surfaces, while the cones may be made to approach or recede from each other to increase or diminish the effective diameters of the pulleys and correspondingly vary the relative speeds of the shafts.

The conical disks on the lathe-spindle or other driven spindle geared thereto and on the driving-shaft are secured thereon by feathers and keys or like devices, which permit of the cones sliding on the shafts, and the cones of each pair are caused to approach or recede from each other by means of a shaft actuating screws, levers, or other devices, which are arranged to act on each pair of cones in unison or in such relation as to open up one pair of cones as the other pair close toward each other, so that the relative speeds of the driving and driven shafts may be varied to any extent without interfering with the free running of the belt or band.

In the accompanying drawings, which illustrate my invention, Figure 1 is an elevation of part of a sliding surfacing and screw-cutting lathe to which the variable-speed gear is adapted, and Fig. 2 is an end view thereof. Figs. 3 and 4 are respectively a longitudinal vertical section and an end elevation showing to a larger scale the speed-varying gear and devices for operating it.

According to my invention I combine with the main spindle or shaft or other running gear of the lathe, so as to form a component part thereof, a speed-varying gear of a well-known type, composed of a bevel-edged driving-band $a$ running upon pulleys $b$ $c$ on a driving-shaft $d$ and on a driven shaft $e$, which is geared to the lathe-spindle $f$ and placed parallel to said shaft $d$, the pulleys being composed of two conical disks $b$ $b'$ and $c$ $c'$, fitted to slide upon their respective shafts $d$ $e$ and having their cone-surfaces facing each other, so that the belt $a$ runs upon said cone-surfaces, while the cones may be made to approach or recede from each other to increase or diminish the effective diameter of the pulleys and correspondingly vary the relative speeds thereof.

In the horizontal lathe shown by Figs. 1 and 2 the driving-shaft $d$, carrying one pair of the conical disks or belt-driving cones $b$ $b'$, is carried in bearings forming part of the lathe, the said shaft being fitted at its end with fast and loose pulleys $g$ $g$, carrying a driving-belt from a pulley on a main shaft overhead. The driven shaft $e$, which is parallel to the driving-shaft $d$ and carries the other pair of conical disks $c\ c'$, which are connected by the belt $a$ with the corresponding disks $b\ b'$ on the driving-shaft $d$, is supported in bearings in the lathe-head $h$ and may form the running spindle of the lathe, but is preferably geared through a train of wheels $i$ to the lathe-spindle $f$, as shown. The speed-varying gear thus forms a component part of the lathe and the usual overhead counter-shaft is dispensed with.

The endwise movements of the conical disks $c\ c'$ and $b\ b'$ of the variable-speed gear to change the speed of the running spindle of the lathe or machine may be effected by devices such as are represented to a larger scale in Figs. 3 and 4. As there shown, one disk $c$ or $b$ on its shaft $d$ or $e$ is keyed to its shaft, which has endwise movement imparted to it, while the other disk $c'$ or $b'$ on the corresponding shaft is on a sleeve $l$, fitted to slide on the shaft. Attached to the shafts $d$ and $e$ and to the sleeves $l$ are externally-screw-threaded sleeves $m\ m'$, and engaging with these are internally-screw-threaded nuts $n$ and $o$, the nut $n$ being around the driving-shaft $d$ and the nut $o$ around the driven shaft $e$. Each of these nuts is formed with a worm-wheel $n'$ or $o'$, and in gear with these worm-wheels are worms $p$ and $q$ on a worm-shaft $r$, which is driven by bevel-gearing $s$ from a cross-shaft $t$, which may be operated by a hand-wheel $t'$. By this arrangement on turning the hand-wheel $t'$ the disks $b\ b'$ of one pair are caused to approach as the disks $c\ c'$ recede from each other, or, vice versa, the disks $c\ c'$ approach as those $b\ b'$ recede to vary the speed of the lathe. On the cross-shaft $t$ is a worm-wheel $u$, with which gears a worm $v$ on the self-acting motion-shaft $w$ of the lathe, the worm-wheel $u$ being loose on the shaft, but being adapted to be made fast thereon by means of a clutch or clamping device $x$, operated by a handle $t^2$. When the worm-wheel $u$ is thus made fast on the shaft $t$, it is continuously and slowly driven from the self-acting motion-shaft $w$, from which the cross-traversing of the tool-carrier is usually effected, so that the speed of the lathe may be varied continuously and automatically by gradual change of the relative positions of the conical disks of the variable-speed gear during the progress of the surfacing or turning operation. When the worm-wheel $u$ is loose, the shaft $t$ may be turned by hand by operating the hand-wheel $t'$ to alter the relative position of the disks $b\ b'\ c\ c'$ of the variable-speed gear, so as to vary the speed by hand. On the worm-wheel $u$ or the clamping-clutch which makes the wheel fast on the shaft is a pinion $u'$, geared to a pinion $u^2$, on whose spindle is a pointer $v'$, adapted to turn around a dial $w'$, which may be graduated to show the extent of change of the variable-speed gear from one extreme position to another, and in that way indicate the speed of the lathe for the time being. Two or more rows of graduations may be provided, one being adapted to indicate the speed when, as shown, the driven shaft $e$ is directly geared to the running spindle $f$ of the lathe and the other or others when other gearing is interposed.

Having now described the invention, what I claim, and desire to secure by Letters Patent, is—

1. A variable-speed mechanism comprising an endwise-movable shaft, having stationary bearings, one of which is enlarged internally, a fixed and a sliding cone-disk on the shaft between its bearings, two externally-threaded sliding sleeves, held from rotary movement, within said enlarged bearing, and in which the shaft freely turns, one of said sleeves abutting at its outer end against the sliding cone-disk, and the other abutting at its outer end against a collar or projection on the shaft, a rotary nut-forming sleeve within said bearing, and engaging the threads on both of said sliding sleeves to move them simultaneously either toward or from each other, and an operating-gear on the nut-forming sleeve, exposed through an opening in said bearing, substantially as described.

2. A variable-speed gear comprising two parallel endwise-movable shafts having stationary bearings, corresponding bearings of which are internally enlarged and provided with lateral openings, a fixed and a sliding cone-disk on each shaft between their bearings, two externally-threaded sliding sleeves held from rotary movement within each of said enlarged bearings, and in which the shaft freely turns, one sleeve of each pair engaging one of the sliding cone-disks to move it longitudinally, and the other engaging the shafts to move them longitudinally, two oppositely-threaded rotary nut-forming sleeves within the said bearings and each engaging one pair of externally-threaded sleeves, gears on said nut-forming sleeves exposed through the said bearing-openings and a shaft having gears at its ends meshing with said first-named gears, substantially as described.

3. The combination with the drive and driven shafts, an expansible pulley on each shaft, means for varying the relative positions of the pulley members to change the speed, and a cross-shaft included in said means, self-acting motion-shaft, loose gearing connecting said shaft with the said cross-shaft, a clutching means for making fast said loose-geared connection to effect a gradual variation of the speed of the driven shaft, and a belt connecting said pulleys.

4. The combination with the drive and driven shafts, an expansible pulley on each shaft, gearing including a connecting-shaft for varying the relative positions of the pulley members to change the speed, and a belt connecting said pulleys, of a cross-shaft geared to said connecting-shaft, a self-acting motion-shaft, loose gearing connecting said shaft with the cross-shaft, and a clutching means for making fast said loose-geared connection to effect a gradual variation of the speed of the driven shaft.

In testimony whereof I have hereunto set my hand in presence of two witnesses.

ROBERT LANG.

Witnesses:
WALLACE FAIRWEATHER,
JNO. ARMSTRONG, Junr.